3,634,219
METHOD OF CORRECTION OF AN OPTICAL SYSTEM BY IRRADIATION
Philippe Sinai, 112 quai Louis Bleriot, 75 Paris 16 eme, France
Filed May 28, 1968, Ser. No. 732,759
Claims priority, application France, May 31, 1967, 108,505; June 12, 1967, 109,917
Int. Cl. B01j *1/10;* G02b *3/00*
U.S. Cl. 204—157.1 R                                20 Claims

ABSTRACT OF THE DISCLOSURE

Modifications to the refractive index are made under the effect of certain radiations with a view to obtaining a correction for the aberrations of optical systems by producing action, not only on the curvatures of the refracting surfaces as was done up to the present time, but also on the refractive index of the optical glasses or materials which constitute the different lenses or dioptric assemblies of the optical system, this object being achieved by progressive irradiation so that a continuous local variation of the refractive index can be caused to take place from the axis to the periphery of at least one lens or dioptric assembly which constitutes said optical system.

---

It is known that optical systems possess a certain number of inherent constitutional defects which limit their field of application.

Defects of this type which deserve special mention are those which are generally known as aberrations.

Geometrical aberrations arise from the fact that, when the angular aperture or angle of inclination of a bundle of light rays to the principal axis of an optical system is such that the sine can no longer coincide with the arc, the different wave surfaces are no longer spherical, anastigmatism no longer exists and the image of a point is no longer a point. The shape of said wave surfaces is a complex function of the refractive index of the optical material or glass employed and of the radii of curvature of the spherical refracting surfaces which constitute the optical system. As a consequence, the different corrections for such aberrations which are already known in the prior art have consisted in modifying to a slight extent the curvature of some of the refracting surfaces which constitute the optical system as well as in using for the construction of said system sometimes a large number of lenses each having refractive indices which can be different from each other. In the particular case of thin lenses, it is known, for example, that converging lenses are too strongly convergent at their edges and that diverging lenses are, on the contrary, too strongly divergent at their edges. This defect gives rise in particular to the principal or so-called spherical aberrations which is well-known to opticians and to which other aberrations are largely related. The variations of refractive index as a function of the wavelength of light are the source of a further class of aberrations or so-called chromatic aberrations which, as is already known, can be limited to a certain extent by means of achromatic or apochromatic systems; however, faults of this type cannot always be reduced to an acceptable level in all cases of application.

Finally, in addition to aberrations, optical systems suffer from other defects which are inherent in the wave character of light and related to diffraction phenomena; the image of a bright point, for example, is surrounded by a series of diffraction rings which are liable to hinder the observation of an adjacent image of lower brightness and consequently to reduce the resolving power.

It is also well known that high-energy particle radiations or electromagnetic radiations produce extensive physical modifications in the optical properties of materials to which they may be applied. Those which have a high automatic displacement cross-section, especially neutrons, protons and ions, modify the refractive index which can either be increased or reduced to a substantial extent, depending on conditions. On the contrary, radiations of the type mentioned which have a high cross-section for interaction with the electron cloud, such as electrons, gamma or X-radiations, modify the transmission of light which may thus be reduced. So far as the refractive index is concerned, modifications to this latter result in particular from the displacements of atoms caused by nuclear collisions which take place at the time of bombardment by heavy particles and high-energy particles which are produced either directly or indirectly; in point of fact, such displacements result in the formation of vacancies between the atoms by ejection of a certain number of these latter from their initial sites and consequently give rise to the presence of interstitial atoms.

A first object of the present invention consists in carrying out the above-mentioned modifications to the refractive index under the effect of certain radiations with a view to obtaining a correction for the aberrations of optical systems by producing action, not only on the curvatures of the refracting surfaces as was done up to the present time, but also on the refractive index of the optical glasses or materials which constitute the different lenses or dioptric assemblies of the optical system, this object being achieved by progressive irradiation so that a continuous local variations of the refractive index can be caused to take place from the axis to the periphery of at least one lens or dioptric assembly which constitutes said optical system.

A second object of the present invention is to provide a novel industrial product which consists of an optical lens or dioptric assembly which is fabricated from a material having a refractive index which varies continuously at each point from the center to the periphery.

A third object of the present invention is to provide a novel industrial product constituted by a centered dioptric system composed of lenses or dioptric assemblies of which a number also possess a refractive index which is continuously variable from the center to the periphery.

A fourth object of the invention consists in applying the modifications in transmission which are produced in the optical materials under the effect of radiations such as β-rays, γ-rays, X-rays or electrons in particular in order to form screens for continuously-variable transmission from one point to another.

A fifth object of the invention is to provide a novel industrial product constituted by the aforesaid screen which is fabricated from an optical material providing continuously-variable transmission from one point to another.

By providing opticians with the means of continuously modifying the second of two sets of parameters, namely radii of curvature and refractive indices which determine the optical properties of a system, the present invention offers novel and highly interesting possibilities in the construction of such optical systems which are corrected to provide freedom from aberrations. In particular, the invention makes it possible to achieve in respect of an equivalent number of lenses a degree of accuracy which has not been equalled heretofore. Stated differently, the invention offers the possibility of forming with a smaller number of lenses a centered system having optical properties comparable with those which could be obtained up to the present time only by means of a complicated set of lenses each having a homogeneous refractive index.

Correction for chromatic aberrations in optical systems is made primarily by means of apochromats in which the foci corresponding to two or three different wavelengths are caused to coincide and the primary residue of chromatic aberration is then corrected. In order to achieve this object, it is unfortunately necessary to have recourse to large amounts of curvature of refracting surfaces, thereby resulting in geometrical aberrations of a high order in the case of spherical lenses. Consequently, this imposes the penalty of limitation to small apertures. In the case of lenses having a variable refractive index according to the invention, it becomes possible, on the contrary, to reconcile such large amounts of curvature of refracting surfaces with corrected geometrical and chromatic aberrations. The orders of magnitude of the variations of index which are obtained vary progressively from 0.01 (silica glasses) to 0.08 (case of quartz), thereby permitting correction of lenses with corresponding apertures.

Of primary interest among the radiations which may be contemplated for general use within the scope of the present invention are the fast or thermal neutrons which are generated in a nuclear reactor. In the event that fast neutrons are adopted, these latter act directly on the atoms of the glass or of the optical material employed. On the contrary, if use is made of thermal neutrons, it is necessary in accordance with the invention to use a glass (or an optical material) which contains a predetermined proportion of an element such as, for example, boron-10 or lithium-6 which is capable of generating high-velocity particles under the action of neutrons. The reaction $(n,\alpha)$ takes place in boron-10 or in lithium-6 within the glass itself whose refractive index is to be modified. The alpha particles thus generated give rise in this case to nuclear collisions involving a certain number of displacements of the atoms which are struck. In this mode of irradiation, the introduction of a small percentage of an element having a high reaction cross-section (boron-10, for example) is necessary in order to create a sufficient number of displacements. Finally, the use of the reaction $(n,\alpha)$ makes it possible to limit scattering and to localize modifications with ease, which is more difficult in the case of fast neutrons inasmuch as these latter are slowed-down by elastic collisions. In fact, the trajectories of the $\alpha$-particles are short, namely of the order of one micron.

The displacement cross-sections are much larger in the case of thermal neutrons than in the case of fast neutrons; the reaction cross-section of boron-10 falls from 4000 barns in the case of thermal neutrons to a scattering cross-section of 4 barns in the case of fast neutrons. For example, the total cross-section of silicon (reaction and scattering) is only 2.5 barns in the case of neutrons in the energy range of 0.01 ev. to 3 kev. Fast neutrons are correspondingly lower in cross-section as the thermal neutrons are distinctly predominant in the spectra of the nuclear reactors employed, especially reactors of the swimming-pool type.

One of the preferred compositions of the optical material which is employed within the scope of the present invention corresponds to an industrial glass having a base of silica containing 0.7% boron-10 in the form $B_2O_3$ (12.5%); natural boron (mixture of boron-10 and boron-11) in turn contains 18.83% boron-10. The reaction cross-section of this glass is approximately 28 barns (0.7% of 4000) whilst its scattering cross-section is approximately 2 barns and is therefore low. The percentage of boron-10 or lithium in the case of the glasses employed can vary over a wide range of the order of 0.1 to 1%.

The disadvantage attached to the use of thermal neutrons lies in the fact that these latter are rapidly attenuated in respect of ordinary concentrations of boron or lithium in the glasses. This attenuation of the thermal neturon flux results in a variation in volume density with the penetration of the radiation. This in turn produces stresses and may give rise in some cases to harmful birefrigence. When thermal neutrons are utilized, it must therefore be ensured that the percentage of boron does not exceed a threshold which is compatible with permissible stresses in regard to the dimensions of the optical parts considered. On the other hand, this drawback does not arise when the irradiation of glasses according to the method of the invention is carried out with fast neutrons.

In selecting a suitable optical material for the treatment according to the invention, further precautions must be taken. In general, these are directed to the consequences of irradiation, on the one hand in regard to the activity which can be induced in the material in the course of this treatment and, on the other hand, in regard to the coloring which may result. The main constituent of glass, namely silica (which is present in a proportion of approximately 60% in common optical glasses) is not troublesome from this point of view. In fact, the half-life of silica—more precisely of $^{31}Si$, which is the only relatively stable isotope of Si—is 2.6 hours; the time taken to attain the safety threshold of 2.5 mr./h. is short; in the case of a silica glass irradiated to $10^{18} th_n/cm.^2$ and having an activity of the order of 1 r./h. at the reactor outlet, the time referred-to is of the order of 22 hours in the case of a lens having ordinary dimensions (3 cm. in diameter).

So far as the other ingredients of the glass are concerned, the elements deactivate with very different half-lives. Some impurities can therefore be permitted and not others; thus, antimony and iron are isotopes having induced activities with long half-lives ($^{55}Fe=2.94$ years and $^{125}Sb=2.7$ years) and having a fairly large order of magnitude; they must in particular be eliminated in the case of ordinary applications. In practice, in the case of a given glass, the stable impurities which are the cause of radioactivity can be identified by spectrometry in order to permit of their removal. In each particular case, the tolerances of residual activity may vary as a function of the applications which are contemplated.

Finally, it is important to note that the activity of the reaction products $(n,\alpha)$ falls off instantaneously, which is not the case of the activation produced by fast neutrons.

Moreover, the irradiation treatment as contemplated by the method according to the invention usually results in coloring of the glasses, which is removed by heat treatment as will be explained hereinafter; it is therefore necessary to ensure that the glass to be treated does not contain any elements which are liable to result in coloring as stable from a thermal standpoint as the modification of index. For this reason, the alkali metals in general (except lithium) and the alkali halides in particular are to be rejected so far as concerns the application of the method according to the invention.

The attenautor which is employed in said method for obtaining a continuous variation of irradiation and therefore of the refractive index of the optical material from the axis of the system to the periphery of each lens can be fabricated from any neutron-absorbing material. As in the case of the lenses which constitute the centered system, the attenautor must possess symmetry of revolution about the axis of said system. In the case in which the radiation is a thermal neutron flux, the attenuator can advantageously be fabricated from a glass which is doped with a thermal-neutron absorbing element such as lithium, boron or cadmium, for example. The profile of the attenuator is determined by calculation as a function of the law of irradiation which it is desired to apply in order to obtain the continuous variation of the index according to the distance from the axis. For reasons of ease of construction, said attenautor could be made up if necessary of a plurality of juxtaposed elements having additive attenuation effects whilst each element can have a different neutron-absorption capacity. Once it has been determined theoretically by calculation, the profile of the attenuator can be checked (and retouched if necessary) by experiment, by autoradiography of a metallic foil of gold or copper, for example, which has been irradiated with the neutron flux across the attenuator and the activity of which will serve to determine whether the dose received as a function of the distance to the axis is in fact exactly the activity which was established by calculation.

According to a variant of the method contemplated by the invention, the irradiation with the requisite dose may be performed without attenuator at each point of the lenses which constitute the centered system to be corrected. In this variant, the operation consists in sweeping the surface of each lens by means of a radiation pencil beam or flat beam in all the technically operative combinations of relative motion of the lens with respect to the radiation flux to which it is subjected. In order to achieve the intended result, each point of the lens must have received on completion of the treatment the neutron dose which has been established by calculation as being necessary to make the requisite correction. It is possible, for example, to rotate the lens about its axis in order to obtain a distribution of revolution of the integrated dose and to adjust this latter along a meridian line. It is also possible to combine the two above-mentioned methods and to cause the part which is provided with its attenuators to rotate about its axis. This has the advantage of making the irradiation uniform along circles when the fluxes are not homogeneous. The dose can then be adjusted along a meridian line.

Finally, the practical application of the method according to the invention additionally entails a stage of decolorizing of the treated glasses which usually takes place under the following conditions. In fact, in the majority of cases, irradiation results in coloring of glasses which lose their transparency to light and must consequently be regenerated from this point of view. According to the invention, the simplest method of restoring transparency consists in heating the glass part to be decolorized for a predetermined period of time and to a temperature such that the threshold of modified-index suppression (or normal-index recovery) is not attained. It is in fact a remarkable and important property of the method according to the invention that, in the case of predetermined glasses, the temperature zone in which decolorizing takes place is lower than or at a maximum adjacent to the temperature zone which would give rise to the suppression of the refractive index modifications obtained. This fact is of paramount importance inasmuch as decolorizing is thereby permitted without affecting the refractive index modifications. In point of fact, in the case of silica glasses in particular, decolorizing takes place within a temperature zone of 100° C. to 320° C. whereas normal-index recovery takes place at temperatures which are usually comprised between 320° C. and 1500° C. Heating within the zone defined over an average period of approximately ten hours is sufficient to remove all coloring in the glass. Decolorizing can also be carried out or accelerated by utilizing the action of light (which has a selective action on the color centers) and particularly the action of ultraviolet light. Finally, it must be noted that lead glasses or cerium oxide glasses afford good resistance to coloring, even in respect of high neutron doses.

According to another property of the method according to the invention, the neutron flux employed for irradiation can be rectified and made uniform if necessary by means of a collimator which is constructed of neutron-absorbing material. This is necessary in particular when a swimming-pool reactor is employed as a thermal neutron source since the flux is substantially isotropic in the vicinity of the reactor core.

Furthermore, it is well known that the action of high-energy radiations on the optical material can produce within the material itself variations in volume density which, in the majority of instances, give rise to variations in volume which are by no means negligible. If irradiation of the optical material or materials employed in the lenses constituting the dioptric system to be corrected is carried out prior to cutting of the lenses, this physical phenomenon does not produce any appreciable consequences in this case. However, if the different lenses which make up the optical system are treated after cutting, there may take place variations in volume which give rise to variations in curvatures and consequently in the wave surfaces which are incompatible with the result to be achieved. In the case last mentioned, it is sometimes necessary according to the method of the invention to correct by means of a complementary polishing treatment any variations in curvatures of the lenses which may have taken place during the irradiation treatment.

Referring now to the defects of optical systems which arise from diffraction, it is known in particular that a screen which limits the angular aperture of the effective-ray bundle at the entrance (entrance pupil) produces diffraction rings about the bright spot which constitutes the image of a point. This is illustrated in FIG. 7 of the accompanying drawings which shows the variation in amplitude of the light vibration A as a function of the distance Z to the center in the case of the image of a point of light in the image plane. The dashed curve 19 shows the known characteristic shape of the light amplitude of said diffraction rings. There can be seen the central portion 20 which corresponds to the bright image-spot of a point through the optical system which is limited by the entrance pupil and the first two concentric light rings 21 and 22. In the specialized terminology, it is said that the diffraction figure has a central or principal maximum in which the greater part of the light energy is concentrated and subsidiary or secondary maxima in which the light energy is considerably lower. It is readily apparent that, when the optical system provides two adjacent images having very different degrees of brightness, the image of the weaker element is liable to merge into the diffraction rings of the brighter element; moreover, it is known that the existence of the subsidiary intensities of the diffraction pattern has the additional effect of reducing contrasts in the images of wide objects.

It is therefore apparent that, for all the reasons given above, it would be desirable to reduce the subsidiary intensites or secondary maxima to a marked degree by "apodizing" the diffraction figure. It is well known theoretically that such a result can be achieved without changing the contour of the aperture of the entrance pupil of the optical system, by modifying the distribution of the amplitude of light vibration in the plane of the aperture: calculation shows that this distribution can be obtained by placing in front of the aperture of the entrance pupil of the system an absorbing screen having a light-transmission capacity which is continuously variable from one point to another and which is a function F $(x, y)$ of each point of the screen. This results in the illumination curve 23 of FIG. 7, in which it is apparent that only the central bright spot 20 remains. It had not proved feasible up to the present time to provide a satisfactory design for a variable-transmission screen or so-called apodizing screen of this type by reason of the difficulties involved in manufacture.

By subjecting ordinary optical materials such as glass (or plastics) to electrons or to electromagnetic radiations such as γ-rays or X-rays, the method of correction of a system by irradiation as provided by the invention offers the specific possibility of constructing variable-transmission screens of the type referred-to which are capable of apodizing the diffraction figures given by an optical system or, conversely, of increasing the contrasts.

As with the variations of refractive index, there is obtained a variable transmission according to the mathematical law which it is known to determine by calculation in each particular case by subjecting the optical material forming the screen to an irradiation dose which is continuously variable from one point to another. The radiations which can be employed for this purpose are those which act on the stability of the electron cloud, so that it is preferable to utilize, for example, γ-rays, X-rays or fast electrons; the X-rays or γ-rays additionally play a part in generating electrons within the interior of the solid. Moreover, the use of those radiations has an advantage in that it does not give rise to induced radioactivity.

As in the case of the modification of index, the irradiation can take place either statically by subjecting the material to the radiation flux through an attenuator and possibly a collimator or by utilizing the flux itself to sweep the optical part which is assumed to be stationary. In the case last mentioned, it is an advantage in accordance with the invention to obtain said sweeping by deflecting the charged particles (electrons, protons, ions) by means of an electromagnetic field and by controlling said deflection in such a manner as to obtain the desired mathematical law of integration of the flux at each point. The sweeping can be, for example, of revolution.

The optical materials which are employed for the production of variable-transmission screens as contemplated by the invention are advantageously constituted by glasses containing lead, thereby producing a black coloring and/or a high proportion (higher than 10%) of alkali metals which result in fairly stable coloring.

Within the scope of the method according to the invention, the unstable color centers can advantageously be removed prior to utilization to the screens; this can be carried out by limited heat treatment over a period of approximately one hour at a temperature of the order of 125° C., for example.

On completion of the operation, variations in transmission are checked directly by means of a densitometer and retouches can be made if necessary.

In general, apodizing screens possess a transmission which decreases from the center to the periphery.

Conversely, in one of the potential applications of the variable-transmission screens according to the present invention which is also of particular interest, a screen which is complementary to the screen employed for apodizing the diffraction figure is utilized for the purpose of sharpening the central diffraction spot and enhancing the resolving power of the optical system with respect to point sources.

The different properties referred to in the fore-going will be explained in greater detail by means of the following description of one exemplified embodiment which is given by way of indication and without any limitation being implied, reference being made to the accompanying drawings, in which.

(a) when no apodizing screen is present, and (b) when a variable-transmission screen is employed in accordance with the invention.

Figure 1:
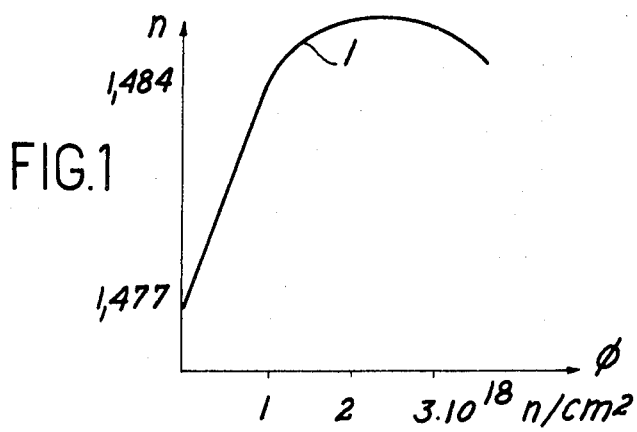
FIG. 1 represents the curve of variation of the refractive index of a borosilicate of the Pyrex type as a function of the thermal-neutron dose received.

The curve of FIG. 1 represents as a function of the thermal-neutron dose received the variations of the refractive index of a borosilicate of the pyrex type having the following composition: $SiO_2$ (80.10%); $B_2O_3$ (12.75%); $Al_2O_3$ (2.25%); $Na_2$ (2.9%); $MgO$ (1%); $CeO_2$ (1%).

Figure 2:
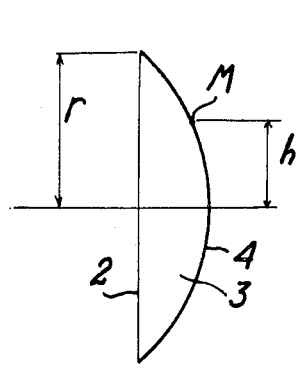
FIG. 2 shows a plano-convex lens which it is proposed to correct.

In the case of this particular glass which has a concentration of boron-10 of 0.5%, it is apparent that the variation of refractive index with the neutron dose is practically linear up to $10^{18}$ n./cm.$^2$ and in respect of temperatures which can attain 100° C. The variation of index which is equal to 1.477 when no flux is present is 0.007 in respect of a dose in the vincinity of $10^{18}$ n./cm.$^2$, which already permits the possibility of correcting lenses having fairly large apertures. In the example herein described, it is proposed to suppress the principal spherical aberration of a plano-convex lens as shown in FIG. 2. The flat face 2 of said lens is directed towards the incident light. The radius of curvature of the convex face 4 is R=152.10 mm.; the radius of the lens is 15 mm. The thickness of the lens at the center is small, namely of the order of 2.5 mm., in order to prevent any flux attenuation from occurring during the irradiation process as a result of the presence of boron-10 in the glass.

The practical application of the method according to the invention entails as a first step a calculation of the index correction to be made at each point of the lens as a function of the distance to the axis and, correlatively, of the neturon dose which must be received at each of said points in order to obtain the desired correction.

This calculation is set forth as follows:

In the case of the glass under consideration, the refractive index is an increasing function of the dose of thermal neutrons received and, in the straight portion of the curve 1 of FIG. 1, can be expressed by the formula:

(1) $$n = n_1 + b\phi$$

wherein $n_1$ is the initial refractive index of the glass prior to irradiation, $\phi$ is the thermal-neutron dose received at a distance $h$ from the axis, and $b$ is a constant.

The principal spherical aberration $\Delta f$ of a thin lens is given by the known expression $Af (r/f)^2$, wherein $r$ is the radius of the lens, $f$ is the focal distance and A is a constant. By assimilating this aberration with the variation in focal distance which results from the variation in convergence of the lens from the center to the periphery, we may write:

(2) $$\Delta f = Af (r/f)^2$$

Moreover, a relation which is known in classical optics associates the relative variation of index with the relative variation in focal distance. This relation is written:

(3) $$\frac{\Delta f}{f} = \frac{\Delta n}{n-1}$$

formula:

(4) $$\frac{\Delta n}{n-1} = -A\left(\frac{r}{f}\right)^2 \text{ or } \Delta n = -(n-1)A\frac{h^2}{f^2} = -ah^2$$

($a$ being a constant) which expresses the variation of index to be obtained at the point M of the lens which is located at the distance $h$ from the axis so as to cause a variation in focal distance which exactly corrects the principal spherical aberration due to this point (FIG. 2).

Comparison of Equations 1 and 4 makes it possible to write—if we still remain on the linear portion of the curve 1 in FIG. 1:

$\Delta n = n - n_. = ah^2 = n_1 + b\phi - n_.$, $n_.$ being the index on the axis in respect of $h=0$, $n=n_o$, $\phi=\phi_o$, $\phi$. being the dose received on the axis, hence $$0 = n_i + b\phi_o - n_o$$

and $$\phi = \frac{-ah^2 - n_i + n_o}{b} = \frac{-ah^2 + b\phi_o}{b} = \phi_o - \frac{a}{b}h^2 \quad (5)$$

If the attenuator employed is constructed of a material which has an absorption coefficient $k$ and a thickness $y$, we may write on the basis of 5, and assuming that said attenuator is placed in an incident flux $\phi_i$:

(6)
$$\phi = \phi_i e^{-ky} = \phi_o - \frac{a}{b}h^2$$

If we establish as an additional condition that the thickness of the attenuator should be zero on the axis, we obtain by putting simultaneously $y=0$ and $h=0$ in (6):

$$\phi_i = \phi_o$$

hence $$e^{-ky} = 1 - \frac{ah^2}{b\phi_o}$$

or else (7)
$$y = -\frac{1}{k} \log_e \left(1 - \frac{ah^2}{b\phi_o}\right)$$

which is finally the desired mathematical expression relating the thickness $y$ of the attenuator to the distance $h$ from the axis. In the particular example described, the glass exhibits a substantial increase of index with the thermal neutron dose and Equation 1 may be written:

(1) $\quad n = 1.478 + 8.35 \times 10^{-21} \phi$

For $\phi = 10^{17}$ neutrons/cm.$^2$, $n = 1.479$
For $\phi = 7 \times 10^{17}$ neutrons/cm.$^2$, $n = 1.484$
Equation 4 is written; $n = -2.28 \times 10^{-3} h^2$ In the case of the glass under consideration, $b = 8.35 \times 10^{-21}$, $k = 4.207$,
$\phi = 7 \times 10^{17}$ n/cm.$^2$ and Equation 7 becomes:

(7)
$$y = \frac{1}{4.207} \log_e (1 - 0.39 h^2)$$

Figure 3:
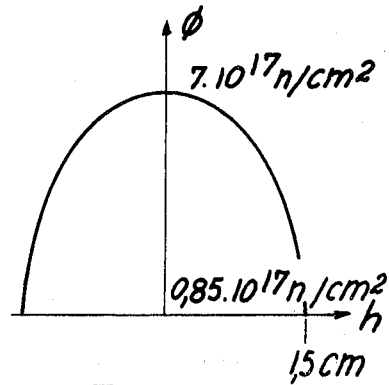
FIG. 3 represents the neutron dose which the lens must receive at each point as a function of the distance $h$ to the axis in order to obtain a correction for the principal spherical aberration.
Figure 4:
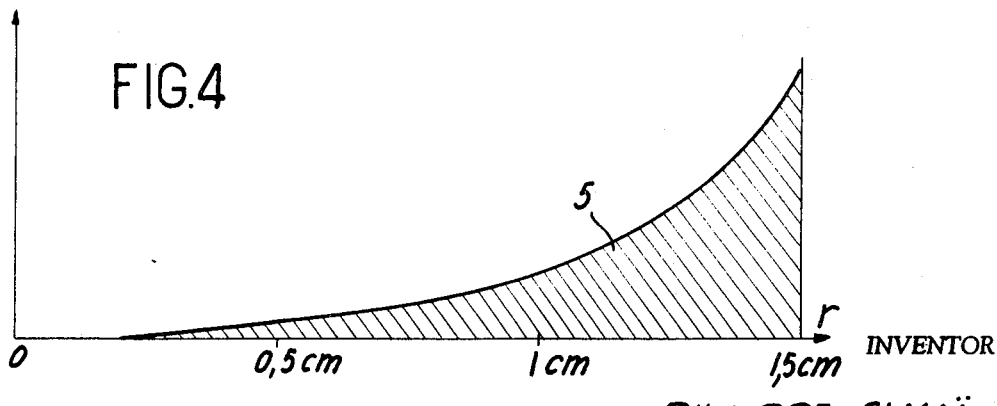
FIG. 4 represents the profile of the glass attenuator which it is necessary to interpose on the path of a uniform neutron flux in order to obtain the law of distribution which is represented in FIG. 3.

The foregoing results in the outline of the attenuator profile represented by curve 5 of FIG. 4 in the case of a uniform and parallel flux. FIG. 3 shows the shape of the curve of the integrated flux as a function of the distance to the axis and FIG. 4 shows in half-section along a meridian line the corresponding profile of the attenuator which is assumed to be fabricated from Pyrex treated by addition of boron-10.

Figure 5:
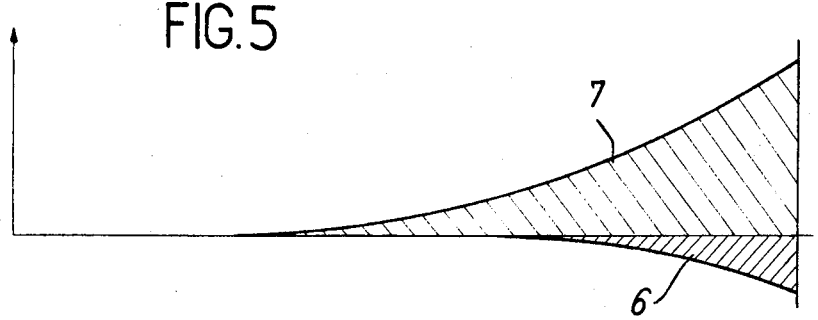
FIG. 5 represents a particular embodiment of the attenuator in which this latter is made up of two parts in contact with each other.

FIG. 5 shows on the same scale a possible construction of the attenuator of FIG. 4, in which this latter is made up of two components (6 and 7) of variable thickness and having a predetermined boron content in each component. This particular form of construction may prove desirable especially for reasons of simplification of fabrication from simple profiles.

Irradiation of the lens and attenuator could be carried out in a nuclear reactor channel in order to obtain a directional effect but it would also be possible to employ a collimator within a swimming-pool reactor in order to obtain high-intensity fluxes.

Figure 6:
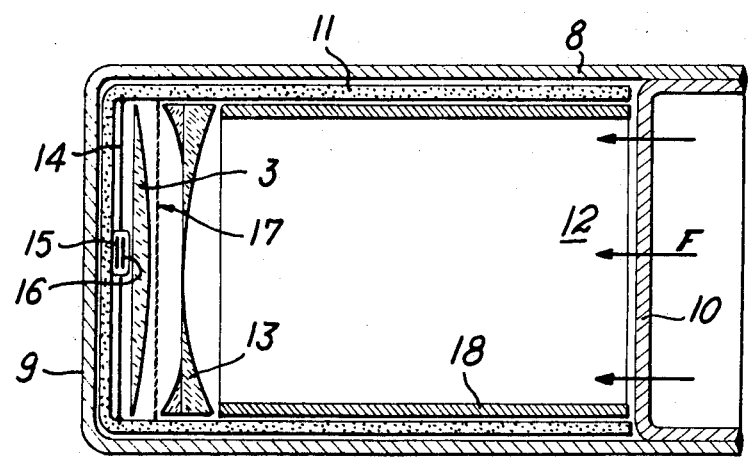
FIG. 6 is an axial sectional view of a collimator of the type which can be employed for ensuring uniformity of an isotropic neutron flux in order to carry out an irradiation in accordance with the method contemplated by the invention.
Figure 7:
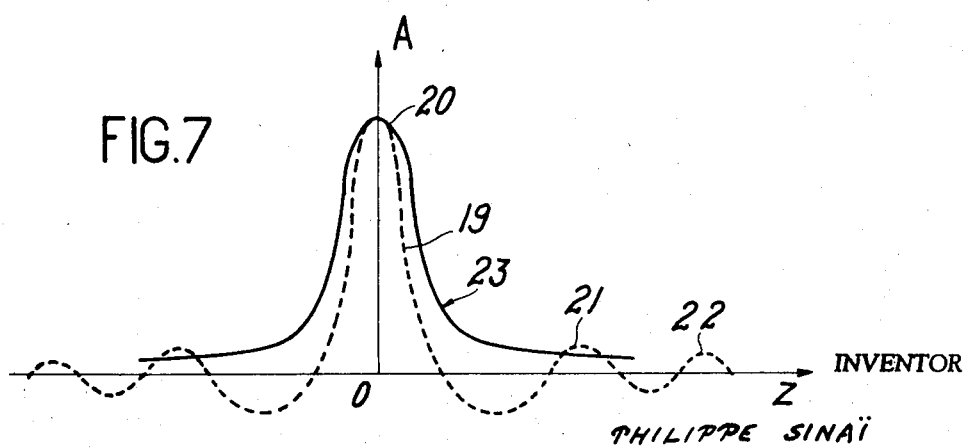
FIG. 7 represents the variation in the image plane of the amplitudes of light intensity exhibited by the image of a point as a function of the distance Z to the central spot.

In the case of the example described, the thermal neutron source employed was a nuclear reactor of the swimming-pool type having a substantially isotropic flux. In this case, according to the method provided by the invention, a collimator of the type shown in FIG. 6 is employed for ensuring uniformity of said flux. Said collimator comprises an outer cylindrical casing 8 formed of aluminum and closed by means of one or two end-caps 9 and 10 which are also formed of aluminum and also press-fitted (or argon-arc welded) on the walls proper of the casing 8. A collimator 11 which is formed of cadmium is placed around the bottom of the casing and its lateral walls are left open to provide only the opening 12 for the penetration of the neutron flux. According to the method under consideration, the attenuator 13 is placed on the neutron flux path which is shown diagrammatically by the arrows F and which is intended to pass through the opening 12 towards the lens 3 to be corrected. Two detectors 15 and 16 constructed of nickel and cobalt and designed to measure respectively the fast-neutron and thermal-neutron fluxes received are located behind the lens and maintained by an aluminum support 14. A foil 17 of copper or gold can be placed between the attenuator 13 and the lens 3 in order to store by activation the total neutron doses which are received by each point of the lens surface, thus serving to check the law of variation of the flux. For this checking operation, the irradiation can be of short duration. The complete device is held in position within the casing 8 by means of an aluminum packing-tube 18 which maintains the attenuator 13 and the lens 3 firmly applied in the bottom of the device. The influence of the collimator on the configuration of the flux which effectively reaches the lens can be determined by calculation. It is demonstrated that, in the case of a circular collimator having a radius $r$, a length L, the ratio $\phi h / \phi$ of the fluxes received at a distance $h$ from the center of the bottom of the collimator and at the center is expressed by the formula:

(8)
$$\frac{\phi'h}{\phi'} = \frac{\sqrt{1 + \frac{h^2}{L^2}} - \frac{h^2 + rh + L^2}{L\sqrt{(r+h)^2 + L^2}}}{1 - \frac{L}{\sqrt{r^2 + L^2}}}$$

In the example described, $L = 5$ cm.
$h$ varies from 0 to 1.5 cm.
$r = 1.5$ cm.

The different values at each point of the lens of the aforesaid ratio $\phi'h/\phi$ must be taken into consideration for the calculation according to Formula 7 of the profile of the attenuator which is accordingly expressed by the equation:

(9)
$$y' = \frac{1}{4.207} \log_e \left(\frac{\phi'h}{\phi} - \frac{\phi}{\phi}\right)$$

In the case of a flux of $10^{13}$ n/cm.$^2$/s which is collimated at the center of the end portion of the collimator, irradiation in the example considered must be carried out for a period of $7 \times 10^4$ seconds, that is to say slightly less than 20 hours, in order to obtain a dose of the order of $7 \times 10^{17}$ n/cm.$^2$.

On completion of the irradiation treatment, decolorizing can be obtained by heating to approximately 260° C. for a period of 24 hours. If necessary, either simultaneous or successive optical decolorizing treatments by ultraviolet radiation may be carried out in order to complete the thermal decolorizing process. The lenses are repolished at the end of the treatment. After a period of approximately one month which is allowed for radioactive decay, the wave surface of the lens which has thus been corrected is observed for the purpose of inspection by the interference method.

What we claim is:

1. A method of construction of a corrected optical system consisting in forming said system by means of lenses or dioptric assemblies in which the materials of at least a number of said assemblies have previously been subjected to irradiation by a flux of corpuscular radiation according to a variable dose in a continuous fashion which is continuously variable along the radius from the axis to the periphery so as to obtain variations of the refractive index which are also continuous according to a law which produces a correction for aberrations of the system, then in subjecting said irradiated lenses to a thermal recolorizing treatment at a temperature which is lower than the temperature of normal-index recovery.

2. A method in accordance with claim 1, wherein variations in volume of the lenses which may arise during irradiation which is carried out after cutting of said lenses are corrected by means of a complementary polishing treatment.

3. A method in accordance with claim 1, wherein the irradiation, which is variable along the radius of the lenses, is obtained from a flux of revolution of known radial distribution by means of an attenuator of revolution which is centered on the axis of the lens and fabricated from a material having a capacity for absorbing the radiations employed and the profile of which has been so determined as to obtain the desired law of radial distribution of the flux.

4. A method in accordance with claim 3, wherein the flux employed is a thermal neutron flux and the glass constituting the lenses is treated by addition of lithium-6.

5. A method in accordance with claim 3, wherein the flux employed is a fast neutron flux.

6. A method in accordance with claim 3, wherein the reflux employed is a fast ion flux.

7. A method in accordance with claim 3, wherein the flux employed is a proton flux.

8. A method in accordance with claim 3, wherein the flux employed is a thermal neutron flux and the glass constituting the lenses is treated by addition of boron-10.

9. A method in accordance with claim 8, wherein the radiation flux is practically uniform.

10. A method in accordance with claim 8, wherein the radiation flux of any configuration is modified by the use of a radiation-tight collimator which is adapted to produce a flux having a predetermined geometrical configuration and suitable for providing the desired irradiation.

11. A method in accordance with claim 1, wherein the irradiation, which is variable along the radius of each lens, is obtained by relative displacement of said lens with respect to a radiation flux in accordance with a law which is so determined so as to obtain the necessary irradiation dose at each point by sweeping the lens surface.

12. A method in accordance with claim 1, wherein the irradiation, which is variable along the lens radius, is obtained by combined action of an attenuator and of a sweeping of the lens surface by the radiation flux.

13. A method in accordance with claim 1, wherein the thermal decolorizing treatment is accelerated by irradiation with ultraviolet light.

14. A method in accordance with claim 1, wherein the thermal decolorizing treatment is carried out by irradiation with ultraviolet light.

15. A method of obtaining an optical screen consisting in irradiating a screen of optical material with a radiation selected from the group consisting of electrons, X-rays and $\gamma$-rays in doses which are continuously variable from one point to another so as to produce a variable transmission of light which is capable of apodizing the diffraction figures of a given optical system, then in removing the unstable color centers by means of a limited heat treatment by a flux of corpuscular radiation such as electron, X-rays, or $\gamma$-rays which may be complemented by irradiation at ultra-violet light.

16. A method in accordance with claim 15, wherein the variable irradiation dose is obtained by means of an attenuator having a variable profile which may be associated with a collimator.

17. A method in accordance with claim 15, wherein the variable irradiation dose is obtained by relative displacement of the screen in the radiation flux.

18. A method in accordance with claim 15, wherein the variable irradiation dose is obtained by sweeping the screen which remains stationary with the radiation flux which is controlled by a deflecting electromagnetic field.

19. A method in accordance with claim 15, wherein the material constituting the screen is a glass containing lead.

20. A method in accordance with claim 15 wherein the optical material constituting the screen is a glass containing a proportion of alkali metals which is higher than 10%.

References Cited

UNITED STATES PATENTS

| 2,675,740 | 4/1954 | Barkley | 204—157.1 |

FOREIGN PATENTS

| 78,991 | 8/1962 | France | 204—157.1 |
| | | (addition to 1,253,956) | |
| 594,201 | 11/1947 | Great Britain | 204—157.1 |
| 1,009,152 | 11/1965 | Great Britain | 204—157.1 |

HOWARD S. WILLIAM, Primary Examiner

U.S. Cl. X.R.

106—47 Q; 350—175 GN, 178, 204, 205, 314